United States Patent

Wood

[11] Patent Number: 5,605,468
[45] Date of Patent: Feb. 25, 1997

[54] ELECTRICAL CONNECTOR ASSEMBLY HAVING REPLACEABLE SLEEVE SEAL

[75] Inventor: Richard G. Wood, Magnolia, Tex.

[73] Assignee: Tescorp Seismic Products, Inc., Houston, Tex.

[21] Appl. No.: 562,017

[22] Filed: Nov. 22, 1995

[51] Int. Cl.⁶ ................................................ H01R 13/52
[52] U.S. Cl. .......................................... 439/282; 439/281
[58] Field of Search ................................... 439/281, 282, 439/271, 272, 273, 274, 275

[56] References Cited

U.S. PATENT DOCUMENTS

| | | | |
|---|---|---|---|
| H113 | 8/1986 | McNeel | 439/282 |
| 2,843,133 | 7/1958 | Barbara | 131/207 |
| 2,881,406 | 4/1959 | Arson | 439/589 |
| 3,197,370 | 7/1965 | Hargett . | |
| 3,449,182 | 6/1969 | Wiltshire | 156/69 |
| 3,461,529 | 8/1969 | Van Dorn | 29/149.5 |
| 3,497,864 | 2/1970 | Barnet . | |
| 3,641,479 | 2/1972 | O'Brien et al. | 439/277 |
| 3,693,133 | 9/1972 | Harbonn et al. . | |
| 3,739,330 | 6/1973 | Hazelhurst et al. | 340/17 |
| 3,745,511 | 7/1973 | Fussell . | |
| 3,783,434 | 1/1974 | Ransford | 439/281 |
| 3,888,559 | 6/1975 | Geib . | |
| 3,937,545 | 2/1976 | Cairn et al. . | |
| 3,954,154 | 5/1976 | Kruppenbach et al. | 181/112 |
| 4,032,214 | 6/1977 | McNerney . | |
| 4,090,759 | 5/1978 | Herrmann | 439/281 |
| 4,150,866 | 4/1979 | Snyder et al. | 439/275 |
| 4,202,592 | 5/1980 | Rullier et al. | 439/281 X |
| 4,214,802 | 7/1980 | Otani et al. | 439/281 X |
| 4,284,312 | 8/1981 | Patchett et al. | 439/281 |
| 4,355,855 | 10/1982 | Rebikoff . | |
| 4,445,741 | 5/1984 | Annoot . | |
| 4,480,151 | 10/1984 | Dozier | 174/153 R |
| 4,497,531 | 2/1985 | Baker . | |
| 4,588,247 | 5/1986 | Grappe et al. . | |
| 4,589,939 | 5/1986 | Mohebban et al. | 156/49 |
| 4,609,247 | 9/1986 | Annoot . | |
| 4,632,482 | 12/1986 | Punako et al. . | |
| 4,758,174 | 7/1988 | Michaels et al. | 439/281 |
| 4,767,349 | 8/1988 | Pottier et al. | 439/191 |
| 4,767,356 | 8/1988 | Grappe | 439/455 |
| 4,790,768 | 12/1988 | Domingues | 439/320 |
| 4,820,170 | 4/1989 | Redmond et al. | 439/66 |
| 4,861,288 | 8/1989 | Friedman | 439/736 |
| 4,921,452 | 5/1990 | Dozier | 439/622 |
| 5,014,813 | 5/1991 | Fussell | 181/122 |
| 5,120,237 | 6/1992 | Fussell | 439/282 |
| 5,120,268 | 6/1992 | Gerrans | 439/736 |
| 5,130,954 | 7/1992 | Fussell | 367/188 |
| 5,145,410 | 9/1992 | Maejima et al. | 439/587 |
| 5,183,966 | 2/1993 | Hurtado et al. | 474/20 |
| 5,199,893 | 4/1993 | Fussell | 439/271 |
| 5,297,974 | 3/1994 | Fussell | 439/320 |
| 5,362,258 | 11/1994 | Arnswald et al. | 439/695 |
| 5,368,499 | 11/1994 | Hirt | 439/281 X |
| 5,387,119 | 2/1995 | Wood | 439/281 |

FOREIGN PATENT DOCUMENTS

| | | |
|---|---|---|
| 63398 | 8/1968 | Germany . |
| 2131633A | 6/1984 | United Kingdom . |

Primary Examiner—Gary F. Paumen
Assistant Examiner—Daniel Wittels
Attorney, Agent, or Firm—P. Weston Musselman, Jr.; Robert McFall; Jenkens & Gilchrist, P.C.

[57] ABSTRACT

An electrical connector assembly comprises a connector body and an elastomeric sleeve seal. The connector body has an end portion with an outer surface defined by three separate cylindrical surfaces with one of the cylindrical surfaces, disposed between the other two cylindrical surfaces, having a predefined diameter different than that of the other two surfaces. The elastomeric sleeve seal has an end portion in which an internal surface is defined by three separate bore surfaces that, when the sleeve seal is assembled with the connector body, forcibly abut a corresponding one of the cylindrical surfaces of the connector body.

9 Claims, 1 Drawing Sheet

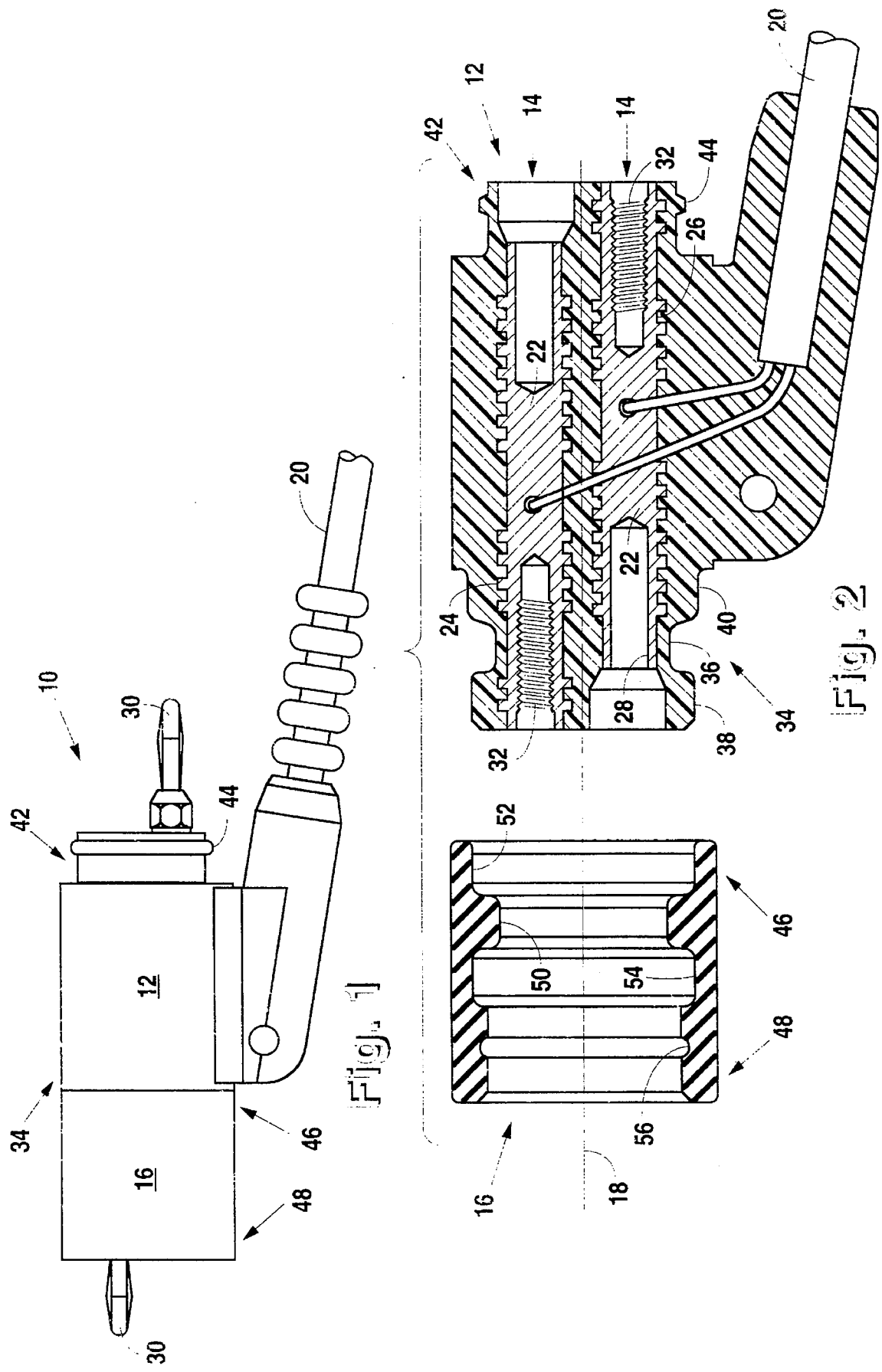

ELECTRICAL CONNECTOR ASSEMBLY HAVING REPLACEABLE SLEEVE SEAL

FIELD OF THE INVENTION

This invention relates generally to a sealed electrical connector assembly suitable for underwater use and more particularly to such a connector assembly having a field replaceable sealing sleeve.

BACKGROUND ART

A long-standing problem with electrical connectors in general, and specifically with electrical connectors intended for use in underwater applications, has been the inability to service and repair the sealing elements of such connectors in the field. Underwater electrical connectors often have mating interconnected components, one of which is generally formed of a relatively soft, deformable material that seats against a relatively hard mating member, to provide a seal around the electrically conductive parts of the connector. For Example, U.S. Pat. No. 4,445,741 issued May 1, 1984 to Ira R. Annoot describes an electrical connector made of an elastic, or relatively soft, insulating material and has O-ring type seals which seat in a mating component. In a similar manner, U.S. Pat. No. 4,609,247 issued Sep. 2, 1986to the same inventor describes an electrical connector assembly wherein a relatively soft female connector plug has two grooves that receive O-rings formed on the periphery of a relatively hard male connector plug. In both of the Annoot connector arrangements, if the relatively soft, or elastic, connector plug loses its ability to seal against the mating plug, as a result of physical damage, aging, or other causes, the entire elastic connector plug assembly must be replaced. Because connectors of such type have electrical contact elements embedded, or molded, within the connector body, the entire connector and attached cable must be replaced.

One solution to the above-described problem of the inability to repair molded connector-contact assemblies in the field is described in copending U.S. patent applications Ser. Nos. 08/226,009 and 08/389,253, filed respectively on Apr. 11, 1994 and Feb. 16, 1995 by the inventor of the present invention, and titled *FIELD REPAIRABLE ELECTRICAL CONNECTOR*. These applications describe a resiliently compressible, replaceable coupling member-that is interposed the male and female components of an electrical connector and provides a waterproof seal around the sheath of each individual electrical contact element of each component in the assembly. The replaceable coupling member described in the copending applications has proven to be highly effective in sealing underwater electrical components. However, in certain configurations, the interposed coupling member requires an outer shell or other structure to maintain the replaceable coupling member in its desired sealing position between the male and female coupling components. Moreover, the coupling member described in the copending applications is contact pattern specific, that is, because the coupling member has internal passageways that seal around each contact element in a particular assembly, it cannot be used in an assembly with a different arrangement, or pattern, of contact elements.

The present invention is directed to overcoming the problems set forth above. It is desirable to have a replaceable sealing member for electrical connectors that seals around the entire external peripheral surface and simultaneously provides resistance to separation of the connected components. It is also desirable to have such a replaceable sealing member that can be used on electrical connectors having a common predefined diameter, regardless of the number of electrical contact elements enclosed within the connector.

BRIEF SUMMARY OF THE INVENTION

In accordance with one aspect of the present invention, an electrical connector assembly comprises a connector body and an elastomeric sleeve that is removably attached to the connector body. The connector body has at least one electrical contact assembly embedded within the body, and an end portion which has an outer surface defined by first, second and third cylindrical surfaces in which the second and third cylindrical surfaces have a diameter different than that of the first cylindrical surface. The second and third cylindrical surfaces are disposed in adjacent relationship with the first cylindrical surface such that the first cylindrical surface forms a circumferentially disposed stepped surface between the second and third surfaces. The elastomeric sleeve has an end portion that includes an inner surface defined by first, second and third bore surfaces. The second and third bore surfaces are disposed in adjacent relationship with the first bore surface, thereby forming a circumferentially disposed stepped surface between the second and third bore surfaces. The three bore surfaces are arranged to respectively forcibly abut a corresponding one of the three cylindrical surfaces of the connector body. Each of the bore surfaces have a diameter that is smaller than the respective abutting cylindrical surface.

In accordance with another aspect of the present invention, an elastomeric sleeve seal, adapted for sealing about a predefined peripheral cylindrical surface of an electrical connector, has an end portion with an inner surface defined by first, second and third bore surfaces. The second and third bore surfaces are disposed in adjacent relationship with the first bore surface such that the first bore surface forms a circumferentially disposed stepped surface between the second and third bore surfaces. Each of the three bore surfaces have a diameter sufficient to provide forced abutting contact with a corresponding predefined cylindrical surface of an electrical connector when the sealing sleeve is assembled on the electrical connector and thereby form a waterproof seal between the peripheral surface of the electrical connector and internal components disposed within the connector.

BRIEF DESCRIPTION OF THE DRAWINGS

FIG. 1 is an elevational view of an electrical connector assembly embodying the present invention; and FIG. 2 is a longitudinal sectional view of the electrical connector embodying the present invention.

BEST MODE FOR CARRYING OUT THE INVENTION

An electrical connector assembly 10 representative of the preferred embodiment of the present invention, includes a connector body 12 having one or more electrical contact assemblies 14 disposed, preferably by molded embedment, within the connector body 12, and an elastomeric sleeve 16 detachably mounted on the connector body 12. As best shown in FIG. 2, both primary components of the connector assembly 10, i.e., the connector body 12 and the elastomeric sleeve 16, are generally concentrically formed about a longitudinal axis 18. In the preferred embodiment of the present invention, the connector body 12 is a paralleling take out plug, or clip, suitable for use in underwater seismic exploration applications. In such applications, the connector body 12 is typically inserted, in series, between mating connectors of an underwater cable, not shown, and provides a parallel cable 20 containing leads, for example connected to a geophone, that are electrically connected to a respective one of the contact assemblies 14 disposed within the connector body 12.

Each of the electrical contact assemblies 14 comprises a conductor 22 formed of an electrically conductive material that is arranged in a direction generally parallel with the longitudinal axis 18 of the connector assembly 10. Each of the conductors 22 preferably has a series of externally disposed lands 24 and grooves 26 which assure sealing and retention when embedded within the connector body. Also, as shown in FIG. 2, each of the conductors 22 has a female socket 28 disposed at one end that is adapted to receive a male pin, such as spring contact pins 30 as illustrated in FIG. 1. The spring contact pins 30 have a threaded base that is adapted to screw into a threaded end 32 of each conductor 22. While other electrical contact arrangements may be used, the illustrated arrangement is particularly desirable because it allows easy field repair of damaged or faulty pins.

The connector body 12 is preferably formed of a relatively hard, generally rigid, thermoplastic material, such as glass reinforced polyurethane, that has a hardness of greater than about 80 durometer as measured on the Shore A scale. The connector body 12 is desirably formed by injection molding with the electrical conductors 22, which may comprise more than the two conductors illustrated, prepositioned within the mold cavity prior to injection of the molten plastic. Upon solidification, molten plastic such as the aforementioned glass reinforced polyurethane will shrink somewhat, thereby tightly gripping and individually sealing the interface between each of the embedded electrical conductors 22 and the surrounding connector body 12.

Importantly, the connector body 12 has a first end portion 34 having an outer surface that is defined by a first cylindrical surface 36 that is flanked by a second cylindrical surface 38 and a third cylindrical surface 40. As illustrated in FIG. 2, the second and third cylindrical surfaces 38,40 have predefined diameters that are different than the predefined diameter of the first cylindrical surface 36 such that the first cylindrical surface 36 is circumferentially stepped, or nonaligned, with the second and third cylindrical surfaces 38,40. In the preferred embodiment of the present invention, the first cylindrical surface 36 is stepped radially inwardly to form a relatively deep groove between the second and third cylindrical surfaces 38,40. However, if desired, the first cylindrical surface 36 could alternatively be stepped radially outwardly to from a raised ring, or band, above the adjacent second and third cylindrical surfaces 38,40. As will be described later in more detail, each of the three cylindrical surfaces 36,38,40 provide sealing surfaces against which corresponding biased bore surfaces of the elastomeric sleeve 16 forcibly abut when the two components are assembled. It is important that each of the three cylindrical surfaces 36,38,40 are circumferentially nonaligned with an adjacent cylindrical surface, i.e., adjacently disposed cylindrical surfaces must have different diameters so that a transverse, radially-extending shoulder is formed between adjacent cylindrical surfaces. This arrangement assures the formation of three separate and distinct sealing areas, or zones, between the peripheral surface of the connector body 12 and the electrical contact assemblies 14 disposed within the electrical connector assembly 10.

If the connector body 12 is an end plug of a cable assembly, the second end of the body 12 is attached to, or integrally formed with, a multiple-lead the cable. As discussed above, in the preferred embodiment of the electrical connector assembly 10, the connector body 12 is a paralleling take-out plug, or clip. In this arrangement, the connector body 12 has a formed second end 42 that is adapted to mate with a line connector or other connector such as another paralleling take-out plug, not shown. In the illustrated embodiment, the second and 42 of the connector body 12 has an O-ring 44 integrally formed on the peripheral outer surface and which sealingly engages an annular groove provided in the mating connector. Alternatively, the second end 42 of the connector body 12 could be shaped in the same manner as the first end 34. When so configured, the connector body 12 may be joined with a mating connector having an end portion shaped like the illustrated second end portion 42, by reversing the orientation of the sleeve seal 16. It can also be seen that the second end 42 of the connector body 12 may have other configurations, or shape, as may be required to mate with particular connectors. For example, the second end portion 42 of the connector body 12 may have multiple O-rings, or alternatively, grooves, to accept one or more O-rings formed on the outer surface of a mating connector. Also, in artic or other cold environment applications in which mating elastomeric materials become rigid regardless of the material's initial room temperatures properites, it may be desirable to form the mating O-rings and grooves, or other seal configuration on the second end 42, with little or no interference fit.

The elastomeric sleeve seal 16 has a first end portion 46 and a second end portion 48 that are spaced apart from each other along the longitudinal axis 18. Importantly, the first end portion 46 is constructed to provide separate seals around each of the three cylindrical surfaces 36,38,40 of the connector body 12. For that purpose, the sleeve seal 16 is formed of an elastomeric material having sufficient resistance to tensile deformation, or stretch, so that when installed in a stretched condition over the first end portion 34 of the connector body 12, the respective mating bore surfaces of the sleeve seal 16 will abut each of the cylindrical surfaces 36,38, 40 with sufficient bias force to provide a waterproof seal between the abutting surfaces. Preferably the elastomeric sleeve seal 16 is formed of an injection moldable, thermoplastic material having a hardness of from about 50 durometer to about 80 durometer as measured on the Shore A scale. Examples of suitable materials include polyurethane and blends of polyurethane and neoprene rubber. If desired, a thin wear-resistant outer sheath of a harder material, such a polyethylene, may be bonded to the outer peripheral surfaces of the sleeve seal 16 in the manner described with reference to the coupling component defined in the above referenced copending application Ser. No. 08/389,253.

The first end portion 46 of the elastomeric sleeve seal 16 has an inner surface that is defined by a first bore surface 50, a second bore surface 52, and a third bore surface 54. The second and third bore surfaces 52, 54 are disposed in axially adjacent relationship with the first bore surface 50 such that the first bore surface 50 forms a circumferentially stepped surface between the second and third bore surfaces 52, 54. In the illustrative embodiment, the first bore surface 50 is stepped radially inwardly to form an inwardly extending ring, or band, that will mate with the inwardly extending first cylindrical surface 36 of the connector body 12.

Importantly, each of the bore surfaces 50,52,54 have an internal diameter, when measured in a free, i.e., unstretched, noncompressed, or otherwise distorted, state that is less than the external diameter of each one of the respectively corresponding cylindrical surfaces 36,38,40. That is, the first bore surface 50 has a free diameter that is less than the predefined diameter of the first cylindrical surface 36 of the connector body 12, the second bore surface 52 has a free diameter that is less than the predefined diameter of the second cylindrical surface 38, and the third bore surface 54 has a free diameter that is less than the predefined diameter of the third cylindrical surface 40.

The actual percentage, or amount, of interference fit between the respective abutting surface diameters is dependent upon the physical material properties of the elastomeric sleeve seal 16, primarily the durometer, or hardness, of the particular elastomeric material used in the construction of the sleeve seal 16. For example, if sleeve seal 16 is formed by an elastomer having a hardness of about 80durometer (Shore A), the interference fit between abutting surfaces should be on the order of about 2% of the predefined diameter of the respective, relatively harder, cylindrical surface. That is, the free diameter of a bore surface should be about 2% less than the predefined diameter of the respective abutting cylindrical surface. If the sleeve seal is formed of a softer elastomer, for example about 50 durometer, the interference fit between respective abutting surfaces should be on the order of about 5% of the predefined diameter of the abutting cylindrical surface.

The second end portion 48 of the elastomeric sleeve seal 16 is constructed to mate with an adjoining connector such as a line connector or another connector body 12, neither of which are shown but which have an end configuration as shown in FIG. 2 on the second end 42 of the connector body 12. Thus, in this illustrative embodiment, the second end portion 48 of the sleeve seal 16 has a groove 56 formed to a diameter slightly less than the diameter of a mating O-ring, such as the O-ring 44 disposed on the second end 42 of a second connector body 12.

Assembly of the sleeve seal 16 onto the connector body 12 is easily accomplished by pushing the first end portion 46 of the sleeve seal 16 over the first end portion 34 of the connector body 12 until the respective first, second and third bore surfaces 50,52,54 are brought into registration with the respective first, second and third cylindrical bore surfaces 36,38,40 of the connector body 12. Once in registration, the respective bore surfaces snap into biased forced abutment with the corresponding cylindrical surfaces.

Importantly, the stepped construction of the respective first end portions 34,46 of the connector body 12 and the sleeve seal 16 not only provide separate seal surfaces as described above but also, as a result of their respectively abutting radially extending transverse walls, resist separation of the two components once they are assembled.

Thus, it can be readily seen that two or more of the connector bodies 12 can be assembled together to provide plural parallel take-outs from a main cable, or trunk line. Additionally, it can be seen that in certain applications, both ends of the connector body 12 could be shaped so that they have the same stepped cylindrical surface configuration described with reference to the first end portion 34 of the illustrated embodiment. In that arrangement, the sleeve seal 16 would also be configured at both ends with identical stepped bore arrangements as described in association with the first end portion 46 of the sleeve seal 16.

INDUSTRIAL APPLICABILITY

The electrical connector assembly 10 and the elastomeric sleeve seal 16 embodying the present invention are particularly useful in underwater applications in which it is necessary to provide waterproof seals for electrical contacts carried within the connector assembly.

The elastomeric sleeve, or sleeve seal, 16 is removably attachable to the connector body 12, thereby making the electrical connector assembly 10 easily repairable in the field. Once installed, the sleeve seal 16 provides resistance to separation of the sleeve seal 16 from the connector body 12.

As the connector assembly 10 ages, the softer sealing sleeve 16 may experience a certain amount of compression set and loses some of its initial ability to biasedly seal against mating surfaces of the connector body 12. Also, the sleeve seal 16 may be accidentally cut or damaged. In any event, the aged or damaged sleeve seal 16 can be readily removed and replaced with a new sleeve seal 16.

Other aspects, features and advantages of the present invention can be obtained from a study of this disclosure together with the appended claims.

What is claimed is:

1. An electrical connector assembly comprising:

a connector body having at least one electrical contact assembly extending in a direction parallel with a longitudinal axis of the connector body and embedded therein, and an end portion which has an outer surface defined by a first cylindrical surface having a predefined diameter and second and third cylindrical surfaces each of which have a predefined diameter different than said first surface, said second and third cylindrical surfaces being disposed in axially adjacent relationship with said first cylindrical surface whereby said first surface forms a circumferentially stepped surface between said second and third surfaces; and an elastomeric sleeve removably attached to said connector body having a longitudinal axis and two end portions spaced apart from each other along said longitudinal axis, at least one of said end portions having an inner surface defined by first, second and third bore surfaces, said second and third bore surfaces being disposed in axially adjacent relationship with said first bore surface whereby said first bore surface forms a circumferentially stepped surface between said second and third bore surfaces, and arranged to respectively forcibly abut a corresponding one of the first, second and third cylindrical surfaces of the connector body, said first bore surface having a free diameter less than the predefined diameter of said first cylindrical surface of the connector body, said second bore surface having a free diameter less than the diameter of said second cylindrical surface of the connector body, and said third bore surface having a free diameter less than the diameter of said third cylindrical surface of the connector body.

2. An electrical connector assembly, as set forth in claim 1, wherein said connector body is formed of a relatively rigid material having a hardness greater than about 80 durometer as measured on the Shore A scale, and said elastomeric sleeve is constructed of a material having a hardness less than the hardness of said connector body.

3. An electrical connector assembly, as set forth in claim 2, wherein said elastomeric sleeve has a hardness of from about 50 to about 80 durometer as measured on the Shore A scale.

4. An electrical connector assembly, as set forth in claim 3, wherein each of the first, second and third bore surfaces of the elastomeric sleeve respectively have a diameter that is from about 5% less than the corresponding first, second and third cylindrical surfaces of the connector body when said elastomeric sleeve is formed of a material having a hardness of 50 durometer, to about 2% less than said corresponding first, second and third cylindrical surfaces when the elastomer sleeve is formed of a material having a hardness of about 80 durometer.

5. An electrical connector assembly, as set forth in claim 1, wherein said circumferentially stepped first cylindrical surface of the connector body has a diameter less than the diameter of the adjacently disposed second and third cylindrical surfaces, and said circumferentially stepped first bore surface of the elastomeric sleeve has a diameter greater than the diameter of the adjacently disposed second and third bore surfaces.

6. An electrical connector assembly, as set forth in claim 1, wherein said connector body is a paralleling take-out plug.

7. An elastomeric sleeve seal, adapted for sealing about a predefined peripheral cylindrical surface of an electrical connector having electrical contact components disposed therein, has a longitudinal axis and two end portions spaced apart from each other along said longitudinal axis, at least one of said end portions having an inner surface defined by first, second and third bore surfaces with said second and third bore surfaces being disposed in axially adjacent relationship with said first bore surface such that said first bore surface forms a circumferentially stepped surface between said second and third bore surfaces, each of said first, second and third bore surfaces having a diameter sufficient to provide forced abutting contact with a corresponding predefined cylindrical surface of an electrical connector when said sealing sleeve is assembled on said electrical connector and thereby form a waterproof seal between the peripheral surface of said electrical connector and the internal components disposed within said electrical connector, wherein said circumferentially stepped first bore surface has a diameter greater than the diameter of the adjacently disposed second and third bore surfaces.

8. An elastomeric sleeve seal, as set forth in claim 7, wherein said elastomeric sleeve seal is constructed of a material having a hardness of from about 50 durometer to about 80 durometer as measured on the Shore A scale.

9. An elastomeric sleeve seal, as set forth in claim 8, wherein each of said first, second and third bore surfaces of the elastomeric sleeve seal respectively have a diameter that is from about 5% less than three corresponding portions of the predefined peripheral surface of said electrical connector when said elastomeric sleeve seal is formed of a material having a hardness of 50 durometer, to about 2% less than said corresponding portions of the predefined peripheral surface of the electrical connector when the elastomeric sleeve seal is formed of a material having a hardness of about 80 durometer.

* * * * *

UNITED STATES PATENT AND TRADEMARK OFFICE
CERTIFICATE OF CORRECTION

PATENT NO. : 5,605,468
DATED : February 25, 1997
INVENTOR(S) : Richard G. Wood

It is certified that error appears in the above-indentified patent and that said Letters Patent is hereby corrected as shown below:

Item [56],
Title Page, under References Cited, U.S. Patent Document, fourth reference, please delete "3,197,370" and insert therein --3,197,730--;

Column 1, line 22, after "ANNOOT", delete "discribes" and insert --describes--;

Column 1, line 25, insert a space between "1986" and "to";

Column 1, line 44, delete the hyphen between "member" and "that";

Column 3, line 49, after "to", delete "from" and insert --form--;

Column 3, line 67, after "multiple-lead", delete "the";

Column 5, line 14, insert a space between "80" and "durometer".

Signed and Sealed this

Twenty-third Day of December, 1997

Attest:

BRUCE LEHMAN

Attesting Officer

Commissioner of Patents and Trademarks